(12) United States Patent
Dong et al.

(10) Patent No.: US 11,520,094 B2
(45) Date of Patent: Dec. 6, 2022

(54) POLARIZING DEVICE AND METHOD FOR PREPARING THE SAME, DISPLAY SUBSTRATE AND DISPLAY DEVICE

(71) Applicant: BOE TECHNOLOGY GROUP CO., LTD., Beijing (CN)

(72) Inventors: Shuilang Dong, Beijing (CN); Da Lu, Beijing (CN); Qingzhao Liu, Beijing (CN); Guoqiang Wang, Beijing (CN); Zhanfeng Cao, Beijing (CN); Jiushi Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 231 days.

(21) Appl. No.: 16/640,195

(22) PCT Filed: May 9, 2019

(86) PCT No.: PCT/CN2019/086138
§ 371 (c)(1),
(2) Date: Feb. 19, 2020

(87) PCT Pub. No.: WO2019/218924
PCT Pub. Date: Nov. 21, 2019

(65) Prior Publication Data
US 2020/0174172 A1    Jun. 4, 2020

(30) Foreign Application Priority Data
May 18, 2018    (CN) .......................... 201810478715.6

(51) Int. Cl.
*G02B 5/30* (2006.01)
*G02B 1/111* (2015.01)
*G02B 1/113* (2015.01)

(52) U.S. Cl.
CPC ............ *G02B 5/3058* (2013.01); *G02B 1/111* (2013.01); *G02B 1/113* (2013.01)

(58) Field of Classification Search
None
See application file for complete search history.

(56) References Cited

U.S. PATENT DOCUMENTS

| 5,767,013 A | 6/1998 | Park et al. |
| 2006/0072194 A1 | 4/2006 | Lee |

(Continued)

FOREIGN PATENT DOCUMENTS

| CN | 1501131 A | 6/2004 |
| CN | 101688934 A | 3/2010 |

(Continued)

OTHER PUBLICATIONS

International Search Report and Written Opinion, including English translation of Box V of the Written Opinion, for International Application No. PCT/CN2019/086138, dated Jul. 25, 2019, 18 pages.

(Continued)

*Primary Examiner* — Derek S. Chapel
(74) *Attorney, Agent, or Firm* — Westman, Champlin & Koehler, P.A.

(57) ABSTRACT

The present disclosure provides a polarizing device and a method for preparing the same, a display substrate, and a display device. The polarizing device includes: a base substrate, a metal wire grid, and an anti-reflection layer, in which the metal wire grid is arranged on the base substrate, the anti-reflection layer is arranged on the surface of the metal wire grid away from the base substrate, and the anti-reflection layer is a carbon film layer.

12 Claims, 5 Drawing Sheets

(56) References Cited

U.S. PATENT DOCUMENTS

| | | | | |
|---|---|---|---|---|
| 2007/0159577 A1* | 7/2007 | Atsushi | ................ | G02B 5/3058 |
| | | | | 349/96 |
| 2008/0316599 A1* | 12/2008 | Wang | ................... | G02B 5/3058 |
| | | | | 359/485.05 |
| 2020/0166683 A1 | 5/2020 | Liu et al. | | |
| 2020/0174172 A1 | 6/2020 | Dong et al. | | |

FOREIGN PATENT DOCUMENTS

| | | | | |
|---|---|---|---|---|
| CN | 101688980 A | 3/2010 | | |
| CN | 106324742 A | 1/2017 | | |
| CN | 106443861 A | 2/2017 | | |
| CN | 107991730 A | 5/2018 | | |
| CN | 108680982 A | 10/2018 | | |
| CN | 109581570 A | 4/2019 | | |
| EP | 1845395 A1 * | 10/2007 | ........... | G02B 5/3058 |
| EP | 2615640 A1 * | 7/2013 | ....... | H01L 27/14621 |

OTHER PUBLICATIONS

First Office Action, including Search Report, for Chinese Patent Application No. 201810478715.6, dated Jul. 15, 2019, 17 pages.

\* cited by examiner

POLARIZING DEVICE AND METHOD FOR PREPARING THE SAME, DISPLAY SUBSTRATE AND DISPLAY DEVICE

CROSS-REFERENCE TO RELATED APPLICATION

This application is a Section 371 National Stage application of International Application No. PCT/CN2019/086138, filed on May 9, 2019, which published as WO 2019/218924 A1, on Nov. 21, 2019, and claims priority to Chinese Patent Application No. 201810478715.6 filed on May 18, 2018, the disclosures of which are incorporated in their entireties by reference herein.

TECHNICAL FIELD

The disclosure relates to the field of display technology, in particular to a polarizing device and a method for preparing the same, a display substrate and a display device including the polarizing device.

BACKGROUND

The working principle of liquid crystal displays is that, with the birefringent property of a liquid crystal, the liquid crystal is rotated under the voltage control so that the incident polarized light is rotated after passing through the lower polarizer, and then emitted from the upper polarizer (perpendicular to the polarization direction of the lower polarizer), that is, the upper and lower polarizers together with the liquid crystal cell function as an optical switch or a light valve. As compared with traditional absorption-type polarizers, metal wire grid polarizers can allow the incident light with it's polarization direction perpendicular to the wire grid direction to pass through, and reflect the incident light with it's polarization direction parallel to the wire grid direction. The ability of a metal wire grid polarizer to allow the incident light to pass through is much greater than that of a traditional absorption-type polarizer to allow the incident light to pass through. However, since the metal wire grid polarizer is made of a metal material, it reflects ambient light, thereby affecting the display effect of the display device.

SUMMARY

In one aspect, the present disclosure provides a polarizing device, including: a base substrate, a metal wire grid and an anti-reflection layer, in which the metal wire grid is arranged on the base substrate, the anti-reflection layer is arranged on a surface of the metal wire grid away from the base substrate, and the anti-reflection layer is a carbon film layer.

Optionally, a surface of the carbon film layer away from the base substrate is uneven.

Optionally, the carbon film layer is made of carbon or a carbon-containing polymer material.

Optionally, the polarizing device further includes: an insulating layer and a planarization layer, the insulating layer covers the anti-reflection layer, and the planarization layer covers the insulating layer, the anti-reflection layer, the metal wire grid, and the base substrate.

In another aspect, the present disclosure also provides a display substrate including any one of the above polarizing devices.

Optionally, the base substrate of the polarizing device is also reused as a base substrate of the display substrate.

In yet another aspect, the present disclosure further provides a display device including any one of the above polarizing devices or the above display substrates.

In yet another aspect, the present disclosure further provides a method for preparing any one of the above polarizing devices, including: providing a base substrate; forming a metal wire grid on the base substrate; and forming an anti-reflection layer on a surface of the metal wire grid away from the base substrate, in which the anti-reflection layer is a carbon film layer.

Optionally, the step of forming the metal wire grid on the base substrate includes: forming a metal layer on the base substrate; coating a photoresist on the metal layer; patterning the photoresist to form a photoresist pattern; and etching the metal layer not covered by the photoresist pattern to form a metal wire grid.

Optionally, the step of forming the anti-reflection layer on the surface of the metal wire grid away from the base substrate includes: performing a dehydrocarbonation treatment on the photoresist pattern to form the anti-reflection layer.

Optionally, the photoresist pattern is subjected to a dehydrocarbonation treatment using a dry etching process or a high-temperature annealing process.

Optionally, the step of performing the dehydrocarbonation treatment on the photoresist pattern to form the anti-reflection layer includes: placing the base substrate formed with the metal wire grid and the photoresist pattern in a dry etching device, in which the dry etching device is aerated with a mixed gas of oxygen and sulfur hexafluoride; and exciting the mixed gas to generate a plasma, and bombarding the photoresist pattern with the plasma generated, so that the photoresist pattern is dehydrocarbonized to form the anti-reflection layer.

DETAILED DESCRIPTION

In order to illustrate the purposes, technical solution and advantages in the embodiments of the present disclosure in a clearer manner, the technical solutions in the embodiments of the present disclosure will be described hereinafter in conjunction with the drawings in the embodiments of the present disclosure in a clear and complete manner. Obviously, the following embodiments relate to a part of, rather than all of, the embodiments of the present disclosure. Based on the described embodiments of the present disclosure, a person skilled in the art may obtain the other embodiments, which also fall within the scope of the present disclosure.

The present disclosure provides a polarizing device and a method for preparing the same, and a display substrate and a display device including the polarizing device, which are used to solve the problem that a metal wire grid reflects ambient light to affect the display effect of a display.

In one embodiment, the present disclosure provides a polarizing device, including: a base substrate, a metal wire grid, and an anti-reflection layer, in which the metal wire grid is arranged on the base substrate, the anti-reflection layer is arranged on the surface of the metal wire grid away from the base substrate, and the anti-reflection layer is a carbon film layer.

The above technical solutions of the present disclosure have produced the following beneficial technical effects.

A carbon film layer is provided on the metal wire grid as an anti-reflection layer. The carbon film layer can absorb at least a part of the ambient light irradiated on the surface of the metal wire grid, thereby reducing the reflection of the ambient light by the metal wire grid in the polarizing device. When the polarizing device is applied to a display device, the display contrast of the display can be improved, thereby improving the display effect.

Figure 1:
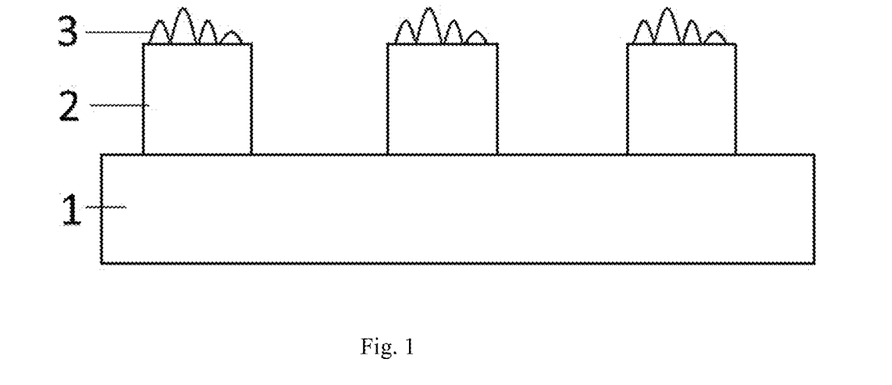
FIG. 1 is a schematic view showing a polarizing device according to an embodiment of the present disclosure.

FIG. 1 is a schematic view showing a polarizing device according to an embodiment of the present disclosure. The polarizing device includes a base substrate 1, a metal wire grid 2, and an anti-reflection layer 3. The metal wire grid 2 is arranged on the base substrate 1, and the anti-reflection layer 3 is arranged on a surface of the metal wire grid 2 away from the base substrate. The anti-reflection layer 3 is a carbon film layer.

In this embodiment, the carbon film layer or the anti-reflection layer 3 arranged on the metal wire grid 2 can absorb at least a part of the ambient light irradiated on the surface of the metal wire grid 2, thereby reducing the reflection of the ambient light by the metal wire grid 2 in the polarizing device, and further improving the display effect of the display.

The optional specific structures of the above-mentioned polarizing device will be described in detailed in the following.

Optionally, the surface of the carbon film layer away from the base substrate may be either flat or uneven. The uneven surface may play a role in diffusely scattering the ambient light. Therefore, setting the surface of the carbon film layer to be uneven may further increase the anti-reflection effect.

Optionally, the carbon film layer is made of carbon or a carbon-containing polymer material. Optionally, the carbon film layer may be obtained by performing a dehydrocarbonation treatment on the photoresist pattern during the preparation of the metal wire grid 2. The carbon film layer thus obtained may contain either only carbon or only a carbon-containing polymer.

Optionally, the base substrate 1 may be made of glass or a resin. Optionally, the metal wire grid 2 may be made of a metal such as aluminum, copper, or the like. Optionally, the thickness of the metal wire grid 2 may be in the range of 100 to 200 nm.

Figure 5:
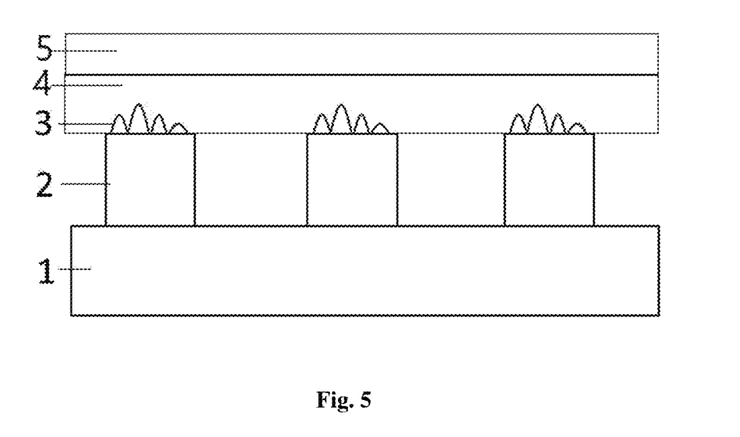
FIG. 5 is a schematic view showing a polarizing device according to another embodiment of the present disclosure.

In an alternative embodiment of the present disclosure, as shown in FIG. 5, the polarizing device further includes an insulating layer 4 and a planarization layer 5. The insulating layer 4 covers the anti-reflection layer 3. The planarization layer 5 covers the insulating layer 4, the anti-reflection layer, the metal wire grid, and the base substrate.

In an alternative embodiment of the present disclosure, the insulation layer deposited on or covering the anti-reflection layer 3 may further increase the roughness of the surface, that is, the surface roughness of the insulating layer 4 covering the anti-reflection layer 3 is greater than the surface roughness of the anti-reflection layer 3. This may further improve the anti-reflection effect of the polarizing device. In addition, the embodiment also coats a planarization layer 5 on the insulating layer 4. The coated planarization layer 5 covers the insulating layer 4, the anti-reflection layer, the metal wire grid, and the base substrate, thereby flattening the surface of the polarizing device. The planarization layer 5 may be made of a high-transmittance resin.

In another embodiment of the present disclosure, provided is a display substrate, including any one of the polarizing devices described in the above embodiments.

Optionally, the base substrate of the polarizing device is also reused as a base substrate of the display substrate. That is, the polarizing device in the embodiment of the present disclosure is integrated on the display substrate. This way of such arrangement does not need to attach a separately prepared polarizing device onto the display substrate, thereby reducing the thickness of a display device including the display substrate.

The display substrate in the embodiment of the present disclosure may be a display substrate applied to a liquid crystal display device. The display substrate may be an array substrate, or may be an counter substrate that is oppositely arranged to the array substrate to form a cell.

In the embodiment of the present disclosure, when the display substrate is an array substrate, the metal wire grid is arranged on the inner side of the base substrate of the display substrate (that is, a side of the base substrate provided with the functional film layer). When the display substrate is a counter substrate, the metal wire grid is arranged on the outer side of the base substrate of the display substrate (that is, a side proximate to the ambient light).

The specific implementation manner of the display substrate including the above-mentioned polarizing device and the beneficial effects thereof are detailed in the above embodiments, and are not repeated here.

In yet another embodiment of the present disclosure, provided is a display device, including the polarizing device in the above embodiment. The display device further includes an array substrate and an counter substrate that is oppositely arranged to the array substrate to form a cell. The polarizing device is an independent component of the display device, which may be attached to the array substrate as a lower polarizer, or may be attached to the counter substrate as an upper polarizer.

In still another embodiment of the present disclosure, provided is a display device, including the display substrate described in the above embodiment. The polarizing device is integrated on an array substrate and/or an counter substrate of the display device.

The overall thickness of the display device can be reduced by integrating a polarizing device on a display substrate of a display device in a manner of sharing a base substrate. For specific integration methods, please refer to the above-mentioned embodiments.

Figure 2:
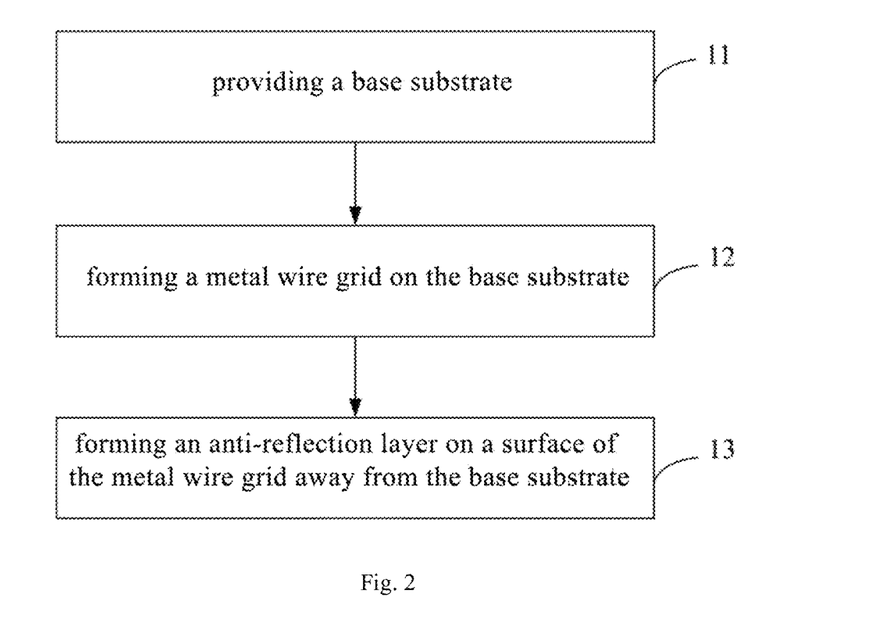
FIG. 2 is a schematic view showing a method for preparing a polarizing device according to an embodiment of the present disclosure.

FIG. 2 is a schematic view showing a method for preparing a polarizing device according to another embodiment of the present disclosure. The method for preparing a polarizing device is used to prepare the polarizing device described in the above-mentioned embodiment, and includes:

step 11: providing a base substrate 1;

step 12: forming a metal wire grid 2 on the base substrate 1; and step 13: forming an anti-reflection layer 3 on the surface of the metal wire grid 2 away from the base substrate, in which the anti-reflection layer 3 is a carbon film layer.

In the embodiment of the present disclosure, a carbon film layer is formed on the surface of the metal wire grid 2 to absorb at least a part of the ambient light irradiated on the surface of the metal wire grid 2, thereby reducing the reflection of the ambient light by the metal wire grid 2 in the polarizing device. When the prepared polarizing device is applied to a display device, the display contrast of the display device can be improved, thereby improving the display effect.

Specifically, the above-mentioned base substrate 1 may be made of glass or a resin.

The specific method for preparing the polarizing device is listed below.

Figure 6:
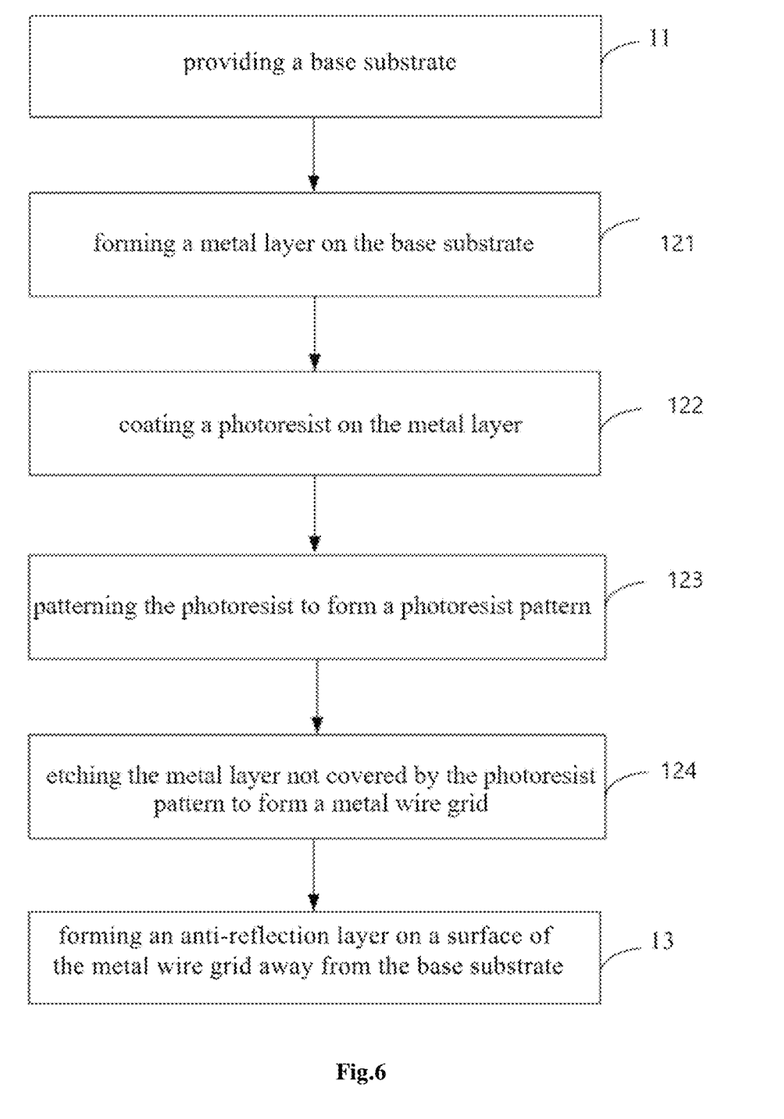
FIG. 6 is a schematic view showing a method for preparing a polarizing device according to another embodiment of the present disclosure.

In an optional embodiment, the above step 12, i.e., the step of forming the metal wire grid on the base substrate, as shown in FIG. 6, includes:

step 121: forming a metal layer on the base substrate 1; optionally, a metal layer may be formed by a deposition process, and the material of the metal layer may be aluminum, and the thickness of the metal layer is in the range of 100 to 200 nm;

step 122: coating a photoresist on the metal layer;

step 123: patterning the photoresist to form a photoresist pattern (i.e., a photoresist wire grid); optionally, the photoresist may be patterned by a photolithography method or an imprint method; and step 124: etching the metal layer not covered by the photoresist pattern to form a metal wire grid 2.

Figure 7:
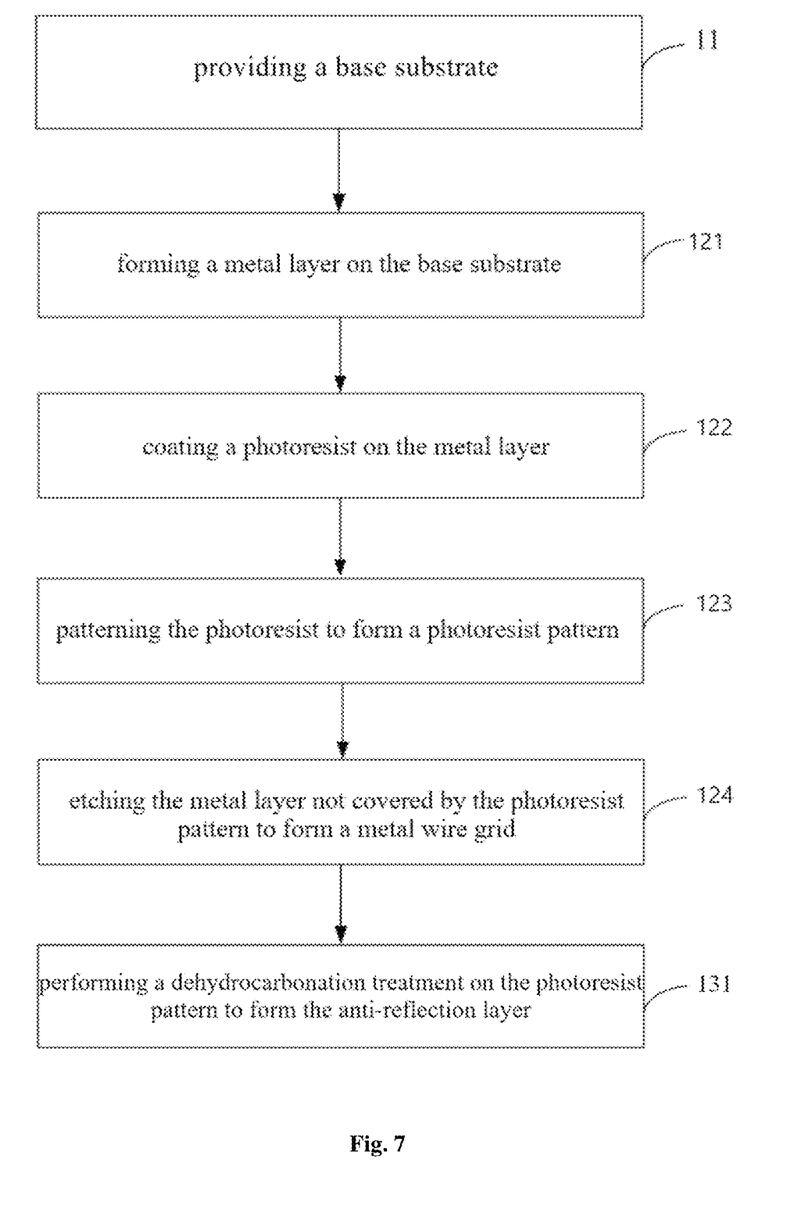
FIG. 7 is a schematic view showing a method for preparing a polarizing device according to a further embodiment of the present disclosure.

In an optional embodiment, the above step 13, i.e., the step of forming the anti-reflection layer 3 on the upper surface of the metal wire grid 2, as shown in FIG. 7, includes:

step 131: performing a dehydrocarbonation treatment on the photoresist pattern to form the anti-reflection layer 3.

In the embodiment of the present disclosure, after the metal wire grid 2 is etched by using the photoresist pattern, an uneven carbon film layer is formed by performing a dehydrocarbonation treatment on the remaining photoresist pattern. On one hand, the uneven carbon film layer can absorb at least a part of the ambient light; and on the other hand, the uneven structure can play a role in diffusely scattering, thereby achieving the purpose of anti-reflection. At the same time, since the carbon film layer is formed using a photoresist for preparing a metal wire grid, the production process is simple and the material is saved.

Optionally, the photoresist pattern may be subjected to a dehydrocarbonation treatment using a dry etching process or a high-temperature annealing process.

Figure 3:
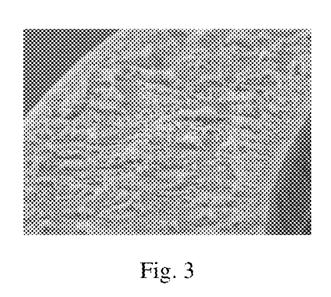
FIG. 3 and FIG. 4 are scanning electron microscopy images of a part of a carbon film layer of a polarizing device according to yet another embodiment of the present disclosure.
Figure 4:
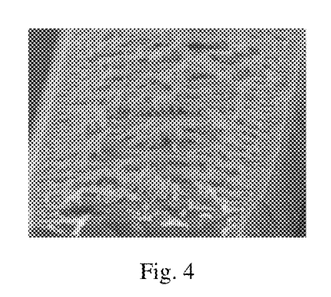

In this embodiment, the photoresist pattern may be subjected to a dehydrocarbonation treatment using a high-temperature annealing process. The step of performing the dehydrocarbonation treatment on the photoresist pattern to form the anti-reflection layer specifically includes: placing the base substrate formed with the metal wire grid 2 and the photoresist pattern in a dry etching device, in which the dry etching device is aerated with a mixed gas of oxygen and sulfur hexafluoride; and exciting the mixed gas to generate a plasma, and bombarding the photoresist pattern with the plasma generated for a long time and in a high power, so that the photoresist pattern is dehydrocarbonized to form the anti-reflection layer. Photographs of the anti-reflection layer 3 (i.e., the carbon film layer) under a scanning electron microscope (SEM) are shown in FIGS. 3 and 4, and the anti-reflection layer 3 has a high-roughness surface.

In an optional embodiment, after the step of performing the dehydrocarbonation treatment on the photoresist pattern to form the anti-reflection layer, the method further includes:

depositing an insulating layer on the anti-reflection layer, in which the surface roughness of the deposited insulating layer is greater than that of the anti-reflection layer, and the insulating layer may further increase the anti-reflection effect; and coating a planarization layer on the insulating layer.

In this embodiment, in order to perform the subsequent processes, a planarization layer needs to be coated on the insulation layer. The planarization layer after coating covers the insulation layer, the anti-reflection layer, the metal wire grid, and the base substrate, thereby flattening the surface of the polarizing device. The planarization layer may be made of a high-transmittance resin.

Unless otherwise defined, technical terms or scientific terms used herein have the normal meaning commonly understood by one skilled in the art in the field of the present disclosure. The words "first", "second", and the like used in the present disclosure does not denote any order, quantity, or importance, but rather merely serves to distinguish different components. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

The above description is the optional embodiment of the present disclosure. It should be noted that one skilled in the art would make several improvements and substitutions without departing from the principles of the present disclosure. These improvements and modifications should also be regarded as the protection scope of the present disclosure.

What is claimed is:

1. A polarizing device, comprising: a base substrate, a metal wire grid, an anti-reflection layer, an insulating layer and a planarization layer stacked in order, wherein the metal wire grid is arranged on the base substrate, the anti-reflection layer is arranged on a surface of the metal wire grid away from the base substrate, and the anti-reflection layer is a carbon film layer; and wherein both surfaces of the carbon film layer and the insulating layer away from the base substrate are uneven, and a surface roughness of the insulating layer is greater than that of the anti-reflection layer.

2. The polarizing device of claim 1, wherein the carbon film layer is made of carbon or a carbon-containing polymer material.

3. A display substrate, comprising the polarizing device of claim 1.

4. The display substrate of claim 3, wherein the polarizing device is integrated on the display substrate.

5. The display substrate of claim 3, wherein the carbon film layer is made of carbon or a carbon-containing polymer material.

6. A display device, comprising the polarizing device of claim 1.

7. The display device of claim 6, wherein the carbon film layer is made of carbon or a carbon-containing polymer material.

8. The display device of claim 6, wherein the polarizing device is integrated on the display device.

9. A method for preparing a polarizing device of claim 1, comprising:

providing a base substrate;

forming a metal wire grid on the base substrate, wherein the step of forming the metal wire grid on the base substrate comprises: forming a metal layer on the base substrate, coating a photoresist on the metal layer, patterning the photoresist to form a photoresist pattern, and etching a part of the metal layer not covered by the photoresist pattern to form the metal wire grid; and forming an anti-reflection layer on the surface of the metal wire grid away from the base substrate, wherein the anti-reflection layer is a carbon film layer, and wherein the step of forming the anti-reflection layer on the surface of the metal wire grid away from the base substrate comprises: performing a dehydrocarbonation treatment on the photoresist pattern to form the anti-reflection layer, wherein after the performing the dehydrocarbonation treatment on the photoresist pattern to form the anti-reflection layer, the method further comprises: depositing an insulating layer on the anti-reflection layer, and depositing a planarization layer on the insulating layer; wherein both surfaces of the carbon film layer and the insulating layer away from the base substrate are uneven; and wherein a surface roughness of the insulating layer is greater than that of the anti-reflection layer.

10. The method of claim 9, wherein the photoresist pattern is subjected to a dehydrocarbonation treatment using a dry etching process or a high-temperature annealing process.

11. The method of claim 9, wherein the step of performing the dehydrocarbonation treatment on the photoresist pattern to form the anti-reflection layer comprises:

placing the base substrate formed with the metal wire grid and the photoresist pattern in a dry etching device, wherein the dry etching device is aerated with a mixed gas of oxygen and sulfur hexafluoride; and exciting the mixed gas to generate a plasma, and bombarding the photoresist pattern with the plasma generated, so that the photoresist pattern is dehydrocarbonized to form the anti-reflection layer.

12. The method of claim 9, wherein after the performing the dehydrocarbonation treatment on the photoresist pattern to form the anti-reflection layer, the method further comprises: coating a planarization layer on the insulating layer.

* * * * *